US006270809B1

(12) United States Patent
Ensley et al.

(10) Patent No.: US 6,270,809 B1
(45) Date of Patent: Aug. 7, 2001

(54) NUTRITIONAL SUPPLEMENTS

(75) Inventors: Burt D. Ensley, Newton, PA (US); Mark Elless, Mount Laurel, NJ (US); Michael J. Blaylock, Dayton, NJ (US); Jianwei Huang, Plainsboro, NJ (US)

(73) Assignee: Phytotech Inc.,, Monmouth Junction, NJ (US)

( * ) Notice: Subject to any disclaimer, the term of this patent is extended or adjusted under 35 U.S.C. 154(b) by 0 days.

(21) Appl. No.: 09/187,608

(22) Filed: Nov. 6, 1998

(51) Int. Cl.$^7$ .......................... A61K 33/24; A61K 35/78

(52) U.S. Cl. ..................... 424/617; 424/600; 424/630; 424/639; 424/646; 424/641; 424/650; 424/655; 424/657; 424/682; 424/702; 424/195.1; 426/74; 514/492; 514/494; 514/499; 514/501; 514/502; 514/505

(58) Field of Search ........................... 426/74; 424/620, 424/621, 657, 600, 604, 655, 646, 630, 650, 682, 639, 722, 702, 641, 195.1; 514/492, 494, 499, 500, 501, 502, 504, 505, 617

(56) References Cited

U.S. PATENT DOCUMENTS

| 4,237,651 | 12/1980 | Caballero ................................. 47/58 |
| 5,364,451 | 11/1994 | Raskin et al. ........................... 75/710 |
| 5,393,426 | 2/1995 | Raskin et al. ........................ 210/602 |
| 5,728,300 | 3/1998 | Kapulnik et al. .................... 210/602 |
| 5,785,735 | 7/1998 | Raskin et al. ........................... 75/711 |

OTHER PUBLICATIONS

Halperin et al., 'Germanium accumulation and toxicity in barley', Journal of Plant Nutrition (1995), vol. 18, No. 7, pp. 1417–1426.*

Berti et al., "Sequential chemical extraction of trace elements: Development and use in remediating contaminated soils," Proc. Third Int'l. Conf. Biogeochem. of Trace Elements (1995).

USEPA, "Test Methods for Evaluating Solid Waste, Physical/Chemical Methods", SW–846, (U.S. Environmental Protection Agency, Washington DC) (Dec. 1996).

Ashraf, M., et al., "Does Pattern Of Ion Accumulation Vary In Alfalfa At Different Growth Stages?," Journal of Plant Nutrition, 17(8):1443–1461 (1994).

Baker, A. J. M., et al., "Terrestrial Higher Plants which Hyper–accumulate Metallic Elements—A Review of their Distribution, Ecology and Phytochemistry," pp. 81–126 (A B Academic Publishers, West Yorkshire, England 1989).

Baker, D.A., et al., "Uptake of Cations and their Transport within the Plant," in Metals and Micronutrients: Uptake and Utilization by Plants (Robb, D.A., et al., eds.) (AP Academic Press, New York, N.Y. 1983).

Banuelos, G.S., et al., "Boron and Selenium Removal in Boron–Laden Soils by Four Sprinkler Irrigated Plant Species," J. Environ. Qual. 22:786–792 (1993).

Banuelos, G.S., et al., "Evaluation of Different Plant Species Used for Phytoremediation of High Soil Selenium," J. Environ. Qual. 26:639–646 (1997).

Banuelos, G.S., et al., "Selenium Accumulation in Selected Vegetables," Journal of Plant Nutrition, 12(10):1255–1272 (1989).

Bird, S.M., et al., "High–performance liquid chromatography of selenoamino acids and organo selenium compounds: Speciation by inductively coupled plasma mass spectrometry," Journal of Chromatography A 789:349–359 (1997).

Brown, S.L., et al., "Phytoremediation Potential of *Thlaspi Caerulescens* and Bladder Campion for Zinc– and Cadmium–Contaminated Soil," J. Environ. Qual. 23:1151–1157 (1994).

Clark, R.F., et al., "Selenium Poisoning From a Nutritional Supplement," JAMA 275(14):1087:1088 (1996).

Cunningham, S.D., et al., "Promises and Prospects of Phytoremediation," Plant Physiol. 110:715–719 (1996).

Davidsson, L., et al., "Iron Bioavailability Studied in Infants: The Influence of Phytic Acid and Ascorbic Acid in Infant Formulas Based on Soy Isolate," Pediatric Research 36(6):816–822 (1994).

Durlach, J., "Magnesium depletion and pathogenesis of Alzheimer's disease," Magnesium Research 3(3):217–218 (1990).

Fahey, J.W., et al., "Broccoli sprouts: An exceptionally rich source of inducers of enzymes that protect against chemical carcinogens," Proc. Natl. Acad. Sci. (USA) 94:10367–10372 (1997).

Fenn, L.B., et al., "Calcium Stimulation of Ammonium Absorption and Growth by Beet," Agron. J. 86:916–920 (1994).

Ip, C., et al., "Potential of Food Modification in Cancer Prevention," Cancer Research (Suppl.) 54:1957s–1959s (1994).

James, L.F., et al., "Selenium Poisoning in Livestock: A Review and Progress," Selenium in Agriculture and the Environment 23:123–127 (1989).

Jones, J. B., et al., "Sampling, Handling, and Analyzing Plant Tissue Samples," in Soil Testing and Plant Analysis, 3d Ed., Chap.15, pp. 389–427 (Soil Science Society of America, Inc. 1990).

Kabata–Pendias, A., et al., in "Trace Elements in Soils and Plants," pp. 102, 108–109, 230–231, and 238–239 (CRC Press, Inc., Boca Raton, FL 1989).

(List continued on next page.)

Primary Examiner—Jose G. Dees
Assistant Examiner—Frank Choi
(74) Attorney, Agent, or Firm—Marshall, O'Toole, Gerstein, Murray & Borun

(57) ABSTRACT

The invention provides methods for producing edible plant tissue biomasses suitable for use as nutritional supplements. The seedlings are exposed to at least one metal and normal seedling growth is interrupted prior to the eleventh day following germination to thereby produce a metal-enriched plant seedling tissue biomass. The metal-containing edible plant tissue biomasses are also provided.

31 Claims, No Drawings

OTHER PUBLICATIONS

Peuke, A.D., et al., "The uptake and flow of C, N and ions between roots and shoots in *Ricinus communis* L. II. Grown with low or high nitrate supply," J. Exp. Botany 45(275):733–740 (1994).

Pugnaire, F. I., et al., "Nutritional Adaptations of Caper Shrub (*Capparis–ovata* Desf.) To Environmental Stress," J. Plant Nutrition 14(2):151–161 (1991).

Rodecap, K.D., et al., "Iron Nutrition Influence on Cadmium Accumulation by *Arabidopsis thaliana* (L.) Heynh.," J. Environ. Qual. 23:239–246 (1994).

Sandstead, H.H., "Zinc Deficiency: A Public Health Problem?," AJDC 145:853–859 (1991).

Salonen, J.T., et al., "Risk of cancer in relation to serum concentrations of selenium and vitamins A and E: matched case–control analysis of prospective data," British Medical Journal 290:417–420 (1985).

Salt, D.E., et al., "Metal Accumulation by Aquacultured Seedlings of Indian Mustard," Environmental Science & Technology 31(6):1636–1644 (1997).

Salt, D.E., et al., "Phytoremediation: A Novel Strategy for the Removal of Toxic Materials from the Environment Using Plants," Bio/Technology 13:468–473 (1995).

Spackman, L.K., et al., "Standard Operating Procedures For The Sampling And Analysis of Selenium in Soil And Overburden/Spoil Material," Agriculture Experiment Station pp. 1–13 (University of Wyoming 1994).

Stoewsand, G.S., et al., "Effect of dietary brussels sprouts with increased selenium content on mammary carcinogenesis in the rat," Cancer Letters 45:43–48 (1989).

Taiz, L., et al., "Mineral Nutrition," in Plant Physiology, Chap. 5, pp. 100–119 (Benjamin/Cummings Publishing Co., Inc. New York, N.Y. 1991).

Teng, Y., et al., "Rhizosphere Phosphorus Depletion Induced by Heavy Nitrogen Fertilization in Forest Nursery Soils," Soil Sci. Soc. Am. J. 59:227–233 (1995).

Tessier, A., et al., "Sequential Extraction Procedure for the Speciation of Particulate Trace Metals," Analytical Chemistry 51(7):844–851 (1979).

Wang, M. Y., et al., "Interactions between $K^+$ and $NH_4^+$: effects on ion uptake by rice roots," Plant, Cell and Environment 19:1037–1046 (1996).

Wilson, S., "A build up of salt in the topsoil has some San Joaquin Valley growers considering certain plant species to help overcome the problem," California Farmer, pp. 25–27 (Jan. 1998).

The Merck Index (10th Ed.), p. 126 (1989).*

* cited by examiner

NUTRITIONAL SUPPLEMENTS

FIELD OF THE INVENTION

This invention relates to the use of seedlings to accumulate metals for the production of nutritional supplements.

BACKGROUND OF THE INVENTION

Metals are required nutrients for animals, including humans and domesticated livestock. The U.S. Dept. of Agriculture has reported the following minimal Recommended Daily Allowances (RDAs) for selected metals in human diets: chromium (0.20 mg), iron (10 mg), manganese (2 mg), selenium (0.07–0.20 mg) and zinc (15 mg). Requirements for specific metals are revealed by the health problems associated with diets deficient in those particular metals. One well-known example is iron deficiency anemia, associated with inadequate levels of iron. With respect to selenium, inadequate levels have been implicated in human cardiovascular diseases, such as Keshan disease, as well as cancer. Chromium is required for insulin activity. Not surprisingly, a lack of chromium interferes with fat, carbohydrate and protein metabolism, leading to a variety of adverse conditions in humans. With respect to zinc, Sandstead, Am. J. Dis. Child. 145:853–859 (1991) reported that a deficiency in humans leads to a suppressed immune system, poor wound healing, dermatitis, and pregnancy complications. And as a final example, manganese deficiency interferes with connective tissue development in animals, leading to structurally defective tissues. Beyond these specific examples, several other metals are needed by humans and other animals to maintain health.

Metal deficiencies, and the resulting health problems for humans and other animals, are likely to be widespread. For example, Sandstead (1991) state that mild zinc deficiencies are common in some human populations. Perhaps more strikingly, chromium deficiency in the well-fed U.S. population has been reported to reach 90% of the population. Efforts to redress metal deficiencies have led to the inclusion of metals in dietary supplements, e.g. trace mineral tablets and capsules, which are costly and typically provide the metal in inorganic form. The form of a metal is significant in that it affects the bioavailability of the metal. Metal bioavailability in a nutritional sense is dependent on the solubility of the metal and the absorbance of the metal by the consuming organism. Generally, a more soluble form of a metal is more readily bioavailable. Unlike the metal forms found inside living organisms, simple inorganic forms of metals exhibit a relatively low solubility and, hence, bioavailability. This, in turn, leads to costly incorporation of excessive quantities of inorganic metal forms in most mineral tablets and capsules as a means of providing even trace quantities of metal for nutritional purposes.

Metals provided as constituents of plants are frequently more palatable and bioavailable than the simple inorganic forms of these metals. For example, metals within plants may be coordinated in compounds that facilitate assimilation by simply increasing the effective solubility of the metal. Provision of nutritionally significant quantities of metals in the form of plant producers is severely hindered by the fact that conventional agricultural methods result in plants with metal levels that are too low to be of practical use as nutritional supplements. Moreover, absent significant control of environmental factors throughout the period of plant growth, there frequently exists a prospect that unwanted or even toxic metals might also be incorporated in plants along with desired metals.

A variety of mature plants have been analyzed for metal content, with the following results (metal concentration in mg/kg dry plant matter noted parenthetically): boron (15–100), chromium (<10), cobalt (0.2–29), copper (5–15), iron (18–1,510), magnesium (2,500–10,000), manganese (5–1,840), molybdenum (0.5–5), selenium (1,355 in garlic, 1,922 in yeast), and zinc (1.2–75). See, Kabata-Pendias et al, in Trace Elements in Soils and Plants, at pages 108 (Table 59), 230 (Table 142), and 238 (Table 146) (CRC Press Boca Raton Fla. 1989); Robb et al., in Metals and Micronutrients: Uptake and Utilization by Plants, at page 5 (Table I) (Academic Press NY 1983). At these levels, adequate metal uptake either cannot be attained or is achieved only with the impractical devotion of a substantial portion of the diet to metal-containing plant foodstuffs. Moreover, supplementing diets with metals from plants introduces the expense and delay of plant cultivation. Also, significant local variation in the metal content of conventional growth environments such as soil has led to unreproducible and, hence, unpredictable levels of metals in plants.

Modifications in plant cultivation methods, such as contacting plants with solutions containing high metal concentrations, have led, e.g., to elevated levels of selenium (i.e., Se) in higher plants such as garlic and brussel sprouts. To date these levels have not exceeded 1,382 mg/kg (i.e., ppm) of dry plant matter. Bird et al., J. Chroma. A 789:349–359 (1997); see also, Ip et al., Cancer Res. (Supp.) 54:1957s–1959s, 1994; Stoewsand et al., Cancer Lett. 45:43–48, 1989).

Of interest to the background of the invention is the use of plants to remove metal pollutants by "phytoremediation." Baker et al., Biorecovery 1:81–126 (1989); Banuelos et al., J. Environ Qual. 19:772:777 (1990); Banuelos et al., J. Environ. Qual. 22:786–792 (1993); Cunningham et al., Plant Physiol. 110:715–719 (1996). Illustratively, U.S. Pat. No. 5,364,451 discloses the use of genetically modified mature plants to remove metals from soils; U.S. Pat. No. 5,785,735 teaches plant-based metal removal from soils manipulated by the addition of chelating agents. In an analogous manner, for aqueous environments, U.S. Pat. No. 5,393,426 discloses the removal of metals using mature plants or portions of mature plants. U.S. Pat. Nos. 5,364,451, 5,785,735, and 5,393,426 are each incorporated herein by reference in their entireties.

Another form of phytoremediation is disclosed in U.S. Pat. No. 5,728,300, which is incorporated by reference herein in its entirety. Plants as young as 1–14 days old are shown to be capable of "depleting" contaminating, usually toxic, metals from aqueous solutions, with the capacity for depletion becoming more pronounced with increasing age. For seedlings less than eleven days old, metal accumulation levels, adjusted upward to account for any variation, did not exceed the following values (accumulation levels originally disclosed in terms of bioaccumulation coefficients have been converted herein to relative mass measures in terms of mg/kg): arsenic (1,400), chromium (1,600), cobalt (800), copper (5,600), magnesium (5,700), manganese (7,500), nickel (450), potassium (19,500), and zinc (3,600). For purposes of phytoremediation, of course, it is not necessary or even relevant to the process that the accumulated metals be processed by the plants into bioavailable forms. The plants will successfully perform their metal-depleting function whether the metals are accumulated in plant tissue or simply adsorbed as inorganic salts on the surfaces of plant roots.

Also of interest to the background of the invention are the disclosures of co-owned, co-pending U.S. patent application Ser. No. 09/041,355, incorporated herein by reference in its entirety, which discloses the use of mature plants having increased levels of accumulated metals as nutritional supplement constituents. Accumulated metals within the plants are noted to exhibit increased bioavailabilty, as determined using the serial solubilization method of Berti et al, Proc. Third Int'l. Conf Biogeochem. of Trace Elements (1995).

Production of metal-enriched mature plants, of course, is rather labor intensive and requires energy in the form of light, as well as nutrients, space, and time for the plants to grow and accumulate metals. The provision of such requirements often adversely impinges on the overall cost-effectiveness of the procedures. Thus, a need continues to exist in the art for new, cost-effective means for generating plant sources of metal nutrients that can reproducibly provide the increased quantities of bioavailable metals necessary to remedy health-impairing metal deficiencies of man and other animals.

SUMMARY OF THE INVENTION

The present invention satisfies the aforementioned need in the art by providing methods for producing nutritional supplements comprising metal-containing seedlings. The invention is based on the discovery that plant seedlings can reproducibly accumulate high levels of one or more metals and convert the metals to more bioavailable forms in an unexpectedly short period of time following germination with minimum need for space or external sources of energy and nutrients. The plant seedlings of the invention have not developed beyond the two-leaf stage which typically extends for ten days following germination under standard temperate zone conditions of light, heat and moisture. Even at such an immature stage of development, plant seedlings have been determined to have a well-developed capacity to accumulate metal, without the additional biomass characteristic of more mature plant forms.

One aspect of the invention is an improvement in a method for producing an edible plant tissue biomass containing nutritionally significant metals by exposing plant tissues to metal-containing solutions under conditions allowing accumulation of metals in the tissues. The improvement provides for exposing plant seedlings to metal-containing solutions during the period of from zero to ten days following germination and then interrupting normal seedling growth prior to the eleventh day following germination to thereby produce a plant seedling tissue biomass providing one or more of the following concentrations of metals on a dry weight basis: arsenic, at least 1,400 mg/kg, boron, at least 100 mg/kg, calcium, at least 20,000 mg/kg, chromium, at least 1,600 mg/kg, cobalt, at least 800 mg/kg, copper, at least 5,600 mg/kg, germanium, at least 100 mg/kg, iron, at least 200 mg/kg, magnesium, at least 6,000 mg/kg, manganese, at least 7,500 mg/kg, molybdenum, at least 100 mg/kg, nickel, at least 450 mg/kg, potassium, at least 20,000 mg/kg, selenium, at least 100 mg/kg, silicon, at least 100 mg/kg, vanadium, at least 100 mg/kg, and zinc, at least 7,400 mg/kg Preferred minimal metal concentrations in edible plant tissue biomasses produced according to the methods of the invention are defined above. Also preferred are edible plant tissue biomasses minimally containing the following metal concentrations (mg metal per kg dry plant matter): arsenic (1,000), boron (1,000), calcium (40,000), chromium (2,000), cobalt (1,000), copper (7,000), germanium (1,000), iron (1,000), magnesium (8,000), manganese (8,700), molybdenum (1,000), nickel (1,000), potassium (25,000), selenium (200), silicon (1,000), vanadium (1,000), or zinc (10,000). Other preferred edible plant tissue biomasses produced according to the invention minimally contain (mg metal per kg dry plant matter): iron (10,000) or selenium (2,000). Based on the preliminary observation that seedling root (as opposed to shoot) development is frequently accompanied by increasing accumulation of metal by adsorption to roots, preferred seedlings are less than seven days old and most preferably less than five days old. Presently preferred seedlings of the invention are members of the Cruciferae family, such as *Brassica juncea, Brassica nigra, Brassica campestris, Brassica carinata, Brassica napus*, and *Brassica oferacea*. The seedlings may be exposed to metal in any environment known in the art, although a hydroponic environment is preferred. With respect to metals, the invention comprehends exposure of seedlings to any metal having nutritional value, with chromium, iron, manganese, selenium and zinc being preferred.

According to another of its aspects, the present invention provides a novel plant seedling biomass obtainable by practice of the methods of the invention and suitable for use as a nutritional supplement that contains at least a certain minimum quantity of a metal. For example, the invention contemplates a plant seedling biomass suitable for use as a nutritional supplement containing at least 1,400 mg arsenic per kg of dry plant matter. The invention further comprehends plant seedling biomasses containing one or more of the following metals in at least the specified concentration on a dry weight basis: 1,400 mg/kg arsenic, 100 mg/kg boron, 20,000 mg/kg calcium, 1,600 mg/kg chromium, 800 mg/kg cobalt, 5,600 mg/kg copper, 100 mg/kg germanium, 200 mg/kg iron, 6,000 mg/kg magnesium, 7,500 mg/kg manganese, 100 mg/kg molybdenum, 450 mg/kg nickel, 20,000 mg/kg potassium, 100 mg/kg selenium, 100 mg/kg silicon, 100 mg/kg vanadium, or 7,400 mg/kg zinc. Preferred plant seedling biomasses, suitable for use as nutritional supplements, contain one or more of the following metals at the minimal concentrations provided above. Other preferred plant seedling biomasses suitable for use as nutritional supplements contain one or more of the following metals in concentrations that fall within the following ranges (defined in mg metal per kg of dry plant matter): arsenic (1,400 to 4,000), boron (100 to 1,000), calcium (20,000 to 70,000), chromium (1,600 to 6,000), cobalt (800 to 1,000), copper (5,600 to 30,000), germanium (100 to 1,000), iron (200 to 60,000), magnesium (6,000 to 60,000), manganese (7,500 to 20,000), molybdenum (100 to 1,000), nickel (450 to 1,000), potassium (20,000 to 30,000), selenium (100 to 5,000), silicon (100 to 1,000), vanadium (100 to 1,000), and zinc (7,400 to 80,000). Also preferred are plant seedling biomasses that are members of the Cruciferae family, which includes *Brassica juncea, Brassica nigra, Brassica campestris, Brassica carinata, Brassica napus*, and *Brassica oleracea*.

The invention also comprehends nutritional supplement capsules, tablets, powders, gels, and liquid or processed foods comprising the aforementioned plant seedling biomass and their use to supplement the diet of man and other animals.

Numerous other aspects and advantages of the present invention will be apparent upon consideration of the following detailed description

DETAILED DESCRIPTION OF THE INVENTION

The present invention provides plant seedling biomasses containing metals for use as nutritional supplements as well as methods for producing plant tissue biomasses containing metals. As seedlings, these nutritional supplements are rapidly produced with a minimal input of the costly requirements for labor, space, nutrients and energy. Moreover, these seedlings have remarkable capacities to accumulate a variety of nutritionally valuable metals, alone or in combination. These advantages permit production of the metal-enriched seedlings of the invention under controlled conditions such as might be found in a hydroponic or aeroponic environment for seedling development and metal exposure. Seedlings produced under such conditions are able to provide the metal nutrients in predominantly bioavailable form while minimizing the risk of also providing deleterious compounds such as toxins. In addition, the high, and predictable, levels of metal accumulation in seedlings provides a concentrated source of bioavailable metal which may be meted out in controlled and precise doses during preparation of nutritional supplements.

The following Examples illustrate various embodiments of the present invention: Example 1 describes the uptake of selenium by seedlings of two species of the Brassica genus; Example 2 discloses the uptake of selenium from solutions of varying selenium concentration; Example 3 reports the various forms of selenium found within seedlings; Example 4 describes the uptake of iron by *Brassica juncea* seedlings; Example 5 discloses the uptake of chromium by *B. juncea* seedlings; Example 6 reports metal uptake by eight different species of seedlings; and Examples 7 and 8 describe independent experiments showing seedlings repeatedly accumulating selenium or iron, respectively.

EXAMPLE 1

Practice of a method in accordance with the invention produced seven-day-old seedlings enriched with selenium. Indian mustard (*Brassica juncea* (L.) Czern.) cultivar 426308 was initially obtained from the USDA/ARS Plant Introduction Station of Iowa State University. Propagation of the cultivar produced seeds which were used for the experiments. Broccoli (*Brassica oleracea* L. (Italian group)) cultivar "saga" was obtained from Johnny's Selected Seeds, Albion, Me.

Seedlings of each plant species were grown in two Biogarten Sprouter trays obtained from Shepherd's Garden Seeds. Seeds were soaked in water for 4 hours and spread evenly in the trays. Developing seedlings were irrigated three times daily with 150 ml water per irrigation. All experiments were conducted at room temperature. Seedlings were shielded from light for 4 days and were exposed to the light for the remaining three days preceding growth interruption. On the fourth and sixth days, one of the two trays containing each crop was treated with 50 ml of a sodium selenate tap water solution at a concentration of 5 mg/L Se. $Na_2SeO_4$ was obtained from Fluka Chemical Co., Ronkonkoma, N.Y. Control trays were treated with the same amount of tap water. On the seventh day, normal seedling growth was interrupted by removing the seedlings from the trays. Seedlings were then rinsed with tap water, dried, and analyzed for selenium (i.e., Se) content, all as described below.

Plants were rinsed in tap water, placed in paper bags, and dried at 70° C. in a forced-air convection oven. The dried material was ground to uniform size (<1 mm) using a stainless steel Wiley Mill (Thomas Scientific, Swedesboro, N.J.) and subjected to a standard wet ashing procedure involving treatment with nitric and perchloric acids, as described in Jones et al., in Soil Testing and Plant Analysis, (Westerman ed.)SSSA Book Series No. 3 (Soil Sci. Soc. Amer., Inc. Madison, Wis.) (3d Ed. 1990). In particular, 250 mg of dry plant material were mixed with 5 ml of concentrated $HNO_3$ in a Folin-Wu digestion tube and incubated for at least 6 hours at room temperature. The samples were then heated to 180–200° C. until the dense yellow fumes disappeared, followed by boiling until the volume was reduced by approximately 50%. One milliliter of concentrated $HClO_4$ was then added to the cooled tubes. The tubes were heated again until the solution was clear (about 60–90 minutes), then removed from the heat source and brought to 25 ml with deionized water. The resulting solution was analyzed for metal content by inductively coupled plasma spectrometry (ICP) Fisons Accuris, Fisons Instruments, Inc., Beverly, Mass.). USEPA, Test Methods for Evaluating Solid Waste, Physical/Chemical Methods, SW-846, (U.S. Environmental Protection Agency, Washington D.C.) (3d Ed. 1986). Certified National Institute of Standards and Technology plant (i.e., peach leaf) standards were carried through the digestion and analyzed as controls. Reagent blanks and known reagent quantities were used where appropriate to ensure that the analyses were accurate.

The 8 grams (wet weight) of seeds initially placed in each tray ultimately produced approximately 5 grams of seedling dry weight (i.e., DW) at harvest. No significant difference in DW was observed between treated and untreated seedlings. Both Brasssica species demonstrated the ability to accumulate Se. The Se concentration was higher in *B. juncea* (1016 mg/kg) compared to the Se concentration in *B. oleracea* (752 mg/kg). Concentration of Se in the control seedlings was below the detection limit (<50 mg/kg) of the method.

EXAMPLE 2

The concentration of metal in seedlings subjected to the methods of the invention is positively correlated with the concentration of metal in the source to which the seedling is exposed. Ten grams of *Brassica juncea* seeds were put in each of 16 trays after soaking for 4 hours in tap water. *B. juncea* seedlings were grown for 7 days. Starting on the fifth day, twice a day all trays were treated with 25 ml per tray of sodium selenate tap water solutions at concentrations of 5 mg/L, 10 mg/L, 20 mg/L, 50 mg/L., 100 mg/L, 200 mg/L, 500 mg/L or 1000 mg/L. A total of five treatments, totaling 125 ml, were applied to each tray. Sodium selenate was applied by pouring a solution in the bottom (poured) of the tray or by spraying(sprayed) the same amount on the seedlings. Control trays were treated in the same manner, but with tap water. On the seventh day, normal seedling growth was interrupted by removing seedlings from the trays and subjecting them to analysis for metal content.

Initially, seedlings were harvested and a sample of the seedlings was separated into tops (plant matter found 5 mm above the source of germination, and bottoms (the rest of the seedling). Tops and bottoms were separately analyzed for Se content. Harvested seedlings, or portions thereof, were placed in paper bags and dried at 60° C. The dried plant material was ground with a Thomas-Wiley Mill until it passed a 20 mesh (approximately 0.85 mm aperture) screen. The ground plant material was then subjected to the wet ashing procedure described in Example 1. Digested plant material was analyzed for metal content by inductively coupled plasma optical emission spectroscopy (i.e., ICP), again as described in Example 1. Table 1 shows the selenium concentration in 7-day-old seedlings of *Brassica juncea* (cv. 426308) exposed to Se at varying concentrations in the nutrient solution. An average Se concentration in seedlings treated with 1,000 mg Se/L solution was 1,862 mg/kg for seedlings sprayed with treatment solution and 1,646 mg/kg for seedlings treated by pouring the Se-containing treatment solution in the tray. In general, over the concentration range from 100 mg/L to 1,000 mg/L, spraying resulted in higher concentrations of Se in seedlings than pouring the Se solution into trays containing the seedlings. At treatment solution concentrations below 100 mg/L, no significant differences were observed. The results presented in Table 1 establish a positive correlation between the concentration of Se in the treatment solution and the concentration of Se in the seedlings. This relationship is expected to exist for all nutritionally valuable metals, at all concentrations of metal in solution and for all seedlings accumulating one or more metals. With respect to Se distribution within the seedlings, a fairly uniform distribution was found. Seedlings tended to have a slightly higher Se concentration in their tops compared to their bottoms. An average top to bottom ratio for "poured" seedlings was 1.06±0.06 and for sprayed seedlings it was 1.20±0.12.

TABLE 1

| Selenium concentration in treatment solution (mg/L) | Selenium concentration in seedling (mg/kg) | |
| --- | --- | --- |
| | Poured | Sprayed |
| 0 | 2 ± 0 | 1 ± 0 |
| 5 | 102 ± 21 | 376 ± 132 |
| 10 | 84 ± 5 | 96 ± 4 |
| 20 | 121 ± 6 | 348 ± 28 |
| 50 | 221 ± 63 | 163 ± 67 |
| 100 | 543 ± 64 | 574 ± 84 |
| 200 | 724 ± 62 | 950 ± 196 |
| 500 | 636 ± 57 | 1,216 ± 121 |
| 1000 | 1,646 ± 108 | 1,862 ± 733 |

EXAMPLE 3

The methods of the invention result in seedlings enriched with a metal: bioavailable form. In the experiment described below, seedlings exposed to an inorganic form of selenium, i.e., selenate, were found to contain significant concentrations of bioavailable selenium in the form of selenoamino acids. *Brassica juncea* 426308 seeds (1 g/pot) were planted in 4.5 inch pots containing fine sand (300 g/pot). The plants were grown in a growth chamber at 25° C., 75% relative humidity, with a 16-hour photoperiod (600 $\mu$mol·m$^{-2}$·sec$^{-1}$) provided by a combination of incandescent and cool-white fluorescent lights. Plants were irrigated by adding water at a rate of 25 ml per day. Seven-day-old plants were treated with one dose of 12.6 mmol sodium selenate (50 mg Se in 50 ml water). Fluka Chemical Co. Normal seedling growth was interrupted by harvesting after 12 days. Harvested seedlings were washed in deionized water and oven-dried at 70° C. overnight. The biomass was then ground to mesh 20 with a Thomas-Wiley Mill and evenly divided. One half was digested and subjected to total Se analysis as described in Example 1; the other half was subjected to an analysis for Se speciation.

To analyze Se speciation, a sample of the ground plant material (200 mg) was combined with 4 ml HPLC grade water Fisher Scientific) in a 15 ml centrifuge tube. The plant material was homogenized in the solution with a glass rod. Protease XIV (20 mg; Sigma Chemical Co.), a proteolytic enzyme, was added to the mixture to hydrolyze proteins and release any selenoamino acids. Tubes were incubated with agitation in a shaker-incubator (Eberbach Corporation, Ann Arbor, Mich.; Model 6010) at 21° C. in the dark for 15 hours on low speed. Samples were centrifuged after incubation at 3000×g for 30 minutes (IEC, Needham Heights, Mass.; Model Centra CL3) and the supernatant was filtered through a 0.45 $\mu$m polypropylene syringe filter (Cat. #6788–1304, Whatman, Inc., Clifton, N.J.). A 3 ml portion of the filtrate was passed through a polysulfone 10,000 NMWC molecular mass cutoff filter (MSI Ultrafuge Centrifuge filter, Cat. #CFP010K3S0, Micron Separations Inc., Westboro, Mass.) by centrifuging overnight at 1500×g. The supernatant was subdivided into three parts and analyzed by ICP for total Se and by High Performance Liquid Chromatography (HPLC) (Waters, Milford, Mass.) and Hydride Generation-Atomic Absorption spectrometry (THG-AAS) for Se speciation The THG-AAS analysis was done at the Soil Testing Laboratory of the University of Wyoming. This analysis permitted the separate identification and measurement of the selenate, selenite and organic-Se distributions in the plant matrix. (See, Spackman et. al., University of Wyoming Agricultural Experiment Station, MP-82:13 (1994)).

HPLC analysis was performed by a method modified from Bird et al., J. Chroma. A, 789:349–359 (1997). An ion-pair chromatography protocol was applied using a Varian C8 (4.6 mm×25 cm) column on a Waters HPLC system (Model 510 isocratic pump, Model 486 UV detector and Model 717 auto-sampler). The flow rate was 1 ml/min, with a sample volume of 100 ml. Eluant was monitored at 220 nm. The mobile phase contained HPLC grade water-:methanol (49:1) with 0.1% trifluoroacetic acid (TFA). All mobile-phase components were purchased from Acros Organics, Pittsburgh, Pa. In addition to analyzing "unextracted" seedling (i.e., seedlings not exposed to Protease XIV following grinding), the extracted biomass pellet was analyzed for total Se content.

ICP analysis of total Se in 12-day-old unextracted plant material showed Se levels of 1,963 mg/kg on a dry weight basis, the same level found in mature plants. The apparent recovery rate of Se in the extract (113%) was calculated as the ratio of the sum of the total Se found in the extract solution (1,953 mg/kg) and the total Se in the plant material after the extraction (256 mg/kg) to the total Se in the plant matrix before extraction. the results show that almost all of the Se (1,953/1,963 mg/kg) was soluble and extracted by the protease and water, indicating a high degree of bioavailability. Additional analyses of the Se forms found in seedlings were performed using THG-AAS, which showed a distribution of 2% selenite, 73% selenate, and 25% organic selenium in the extract solution.

Further analysis of the organic selenium fraction was undertaken using HPLC analysis, which is known in the art as a technique particularly suited to resolving and quantifying bioavailable selenoamino acids such as selenomethionine, selenocysteine, and methylselenocysteine. HPLC fractionation resolved 5 unidentified peaks containing organic Se. One peak, eluting at 13 minutes, coincided with a selenomethionine standard (Acros). The material eluting in this peak was analyzed by ICP for Se content and found to contain 420 mg/kg of the organic Se content of the seedlings. Thus, 86% of the organic Se was found in the form of selenomethionine.

EXAMPLE 4

The methods of the invention, are versatile in producing seedlings enriched with any one, or more of a variety of metals. Moreover, practice of the methods does not require exposure of seedlings to complex solutions of metals to promote seedling development and metal accumulation. A comparative study was conducted to assess the potential interactive effects of various salts found in the standard nutrient solution on the development of plant seedlings. Seeds of *Brassica juncea* (cv. 426308) were uniformly placed in plastic containers and soaked with either a simple salt solution consisting of 0.5 mM $CaSO_4$, the nutrient solution described in Example 1, or tap water. Seeds were then germinated in the dark with an irrigation schedule of 50 ml of the relevant solution applied three times daily. Three days after seed germination, a complete nutrient solution was supplied to the seedlings. The composition of nutrient solution was, in mM,: K—2.0 ($KNO_3$, $KH_2PO_4$, and KCl); Ca—0.5 [$Ca(NO_3)_2$]; Mg—0.2 ($MgSO_4$); S—0.2 ($MgSO_4$); $NH_4$—0.1 ($NH_4NO_3$); $NO_3$—3.1 ($NH_4NO_3$, $Ca(NO_3)_2$, and $KNO_3$; P—0.1 ($KH_2PO_4$); and, in $\mu M$,: Cl—50 (KCl); B—12 ($H_3BO_4$); Mn—2.0 ($MnSO_4$); Zn—0.5 ($ZnSO_4$); Cu—0.2 ($CuSO_4$); Mo 0.1 ($Na_2MoO_4$); Ni—0.1 ($NiSO_4$), and Fe—20 ($FeSO_4$). Chemicals, in particular $FeSO_4 \cdot 7H_2O$, were typically obtained from Sigma Chemical Co., St. Louis, Mo. The solution pH was maintained at 6.0. When seedlings were five days old, iron (i.e., Fe) treatment was initiated. Each one of the above-described solutions was supplemented with Fe at concentrations ranging from 20–500 mM. Seedlings were exposed to the relevant Fe-supplemented solution over a two-day period involving application of 50 ml of the supplemented solution three times per day. Following this Fe treatment, the normal growth of the seedlings was interrupted by physically removing, or harvesting, the seedlings. At harvest, seedlings were separated into shoots and roots, or retained as whole plants. The plants were washed three times three times with 1 L deionized water per wash before drying in an oven at 70° C. Plants were analyzed as described in Example 1.

Iron accumulated in the seedlings as a function of Fe concentration in the nutrient solution. Plant Fe concentration increased almost linearly with increasing Fe concentration in the solution, up to 100 mM. Table 2 presents the iron concentrations found in 8-day-old seedlings of *Brassica juncea* (cv. 426308) as a function of the Fe concentration in the nutrient solution. Whole plants denote essentially intact seedlings, including shoots and roots, and control plants denote seedlings exposed to a typical Fe concentration of 20 $\mu M$. An increase in solution Fe from 100 to 250 mM increased Fe concentration in shoots and whole plants slightly, as shown in Table 2. However, increasing the Fe level in the nutrient solution from 250 mM to 500 mM resulted in a decrease in shoot Fe concentration, but not in root Fe concentration, indicating a decrease in Fe translocation from roots to shoots. The data show that these seedlings can achieve shoot Fe concentrations greater than 25,000 mg/kg, which is more than 150-fold higher than the Fe concentration typically found in vegetable crops. The data show that Fe-enriched young seedlings of *Brassica juncea* can be produced rapidly (i.e., a crop cycle of less than 10 days). These Fe-enriched seedlings can be used as an Fe-rich green vegetable, or can be processed as an Fe supplement to improve animal, including human, Fe nutrition. Further, the growth of seedlings exposed to either a simple salt solution (0.5 mM $CaSO_4$) or to tap water prior to Fe treatment accumulate similar Fe levels. Consequently, the methods of the invention will produce metal-enriched seedlings without the use of nutrient solutions containing complex combinations of salts. On the other hand, exposure to many salts simultaneously does not noticeably impair the capacity of the seedlings to accumulate a metal of interest. In fact, the invention contemplates the accumulation of one or more metals by plant seedlings.

TABLE 2

| Fe concentration in treatment solution (mg/L) | Fe concentration in seedling (mg/kg) | | |
| --- | --- | --- | --- |
| | Shoot | Whole plant | Control (whole plant) |
| 1 | 193 ± 19 | 690 ± 50 | 149 ± 14 |
| 5 | 239 ± 20 | 1,750 ± 100 | 150 ± 15 |
| 25 | 1,840 ± 180 | 8,950 ± 800 | 140 ± 10 |
| 50 | 10,950 ± 1,000 | 18,600 ± 1,000 | 149 ± 10 |
| 100 | 25,200 ± 2,500 | 31,120 ± 1,500 | 150 ± 15 |
| 250 | 27,262 ± 2,500 | 35,526 ± 3,500 | 150 ± 12 |
| 500 | 24,500 ± 2,400 | 41,307 ± 4,000 | 150 ± 10 |

EXAMPLE 5

*Brassica juncea* (cv. 426308) seedlings also was grown from seed in trays as described in Example 2. When seedlings were five days old, chromium (i.e., Cr) treatment was initiated. Plants were exposed to nutrient solutions supplemented with Cr concentrations ranging from 12.5 mM to 50 mM (as $CrCl_3 \cdot 6H_2O$; Sigma Chemical Co.) Seedlings were exposed to the Cr-supplemented solutions at a rate of 2.0 L of solution per square meter of tray area for 48 hours. Normal seedling growth was then interrupted by harvesting the seedlings. Harvested seedlings were rinsed three times with 1 L deionized water per wash before being separated into shoots and roots, or retained as whole plants. The plant materials were then dried in an oven at 70° C. Plants and plant portions were analyzed as described in Example 1.

Cr accumulation in the seedlings was a function of Cr concentration in the nutrient solution. Seedling Cr concentration increased almost linearly with increasing Cr concentration in the solution. In Table 3, chromium concentration in 7-day-old seedlings of *Brassica juncea* (cv. 426308) is shown as a function of Cr levels in the nutrient solution. Whole plants denote intact seedlings which include shoots and roots; control plants denote whole seedlings grown in Cr-free solution. The data show that Cr-enriched young seedlings also can be produced rapidly with a crop cycle of less than 10 days. Using these methods, young plants having a shoot Cr concentration greater than 16,000 mg/kg have been produced.

TABLE 3

| Chromium concentration in treatment solution (mg/L) | Chromium concentration in seedling (mg/kg) | | |
| --- | --- | --- | --- |
| | Shoot | Whole plant | Control (whole plant) |
| 0.0 | 10 ± 2 | 10 ± 2 | 10 ± 2 |
| 12.5 | 728 ± 70 | 4,021 ± 400 | 10 ± 2 |
| 25.0 | 5,578 ± 500 | 8,558 ± 800 | 10 ± 2 |
| 50.0 | 16,050 ± 1,600 | 15,780 ± 1,500 | 10 ± 2 |

EXAMPLE 6

Indian mustard (*Brassica juncea* (L.) Czern.)cultivar 426308 was maintained using conventional growth conditions and seeds were recovered. Other cultivars were obtained from "Johnny's Selected Seeds." Nine cultivars of eight different species (see Table 4 below) were grown in plastic containers as described in Example 4, with tap water used as the water source. On the fifth day of growth, seedlings were exposed to 15 ml of a 500 mg/L sodium selenate (Fluka Chemical Co.) solution in tap water. Two days after exposure to the selenium solution, normal seedling growth was interrupted by harvesting the seedlings, followed by seedling analysis as described in Example 1.

The results indicated that all cultivars accumulated significant quantities of selenium, as shown in Table 4. All representatives of the Cruciferae family (Brassica spp. and Raphanus sp.) accumulated selenium to levels of more than 2,000 mg/kg of dried plant mass. As the data in Table 4 show, a wide variety of seedling species accumulated relatively high levels of selenium, as evidenced by the lower bound of 863 mg/kg found in wheat seedlings.

TABLE 4

| Plant species | Selenium concentration (mg/kg) | |
| --- | --- | --- |
| | Control | Treated |
| *Raphanus sativa* (radish) | <1 | 3,086 ± 1,622 |
| *Brassica oleracea* (broccoli) | <1 | 2,896 ± 680 |
| *Brassica juncea* (L.) Czern. (Indian mustard 426308) | 5 | 2,586 ± 297 |
| *Brassica juncea* (L.) Czern. (Mustard) | 3 | 2,382 ± 1,043 |
| *Allium fistulosum* (L.) (White onion) | <1 | 1,532 ± 229 |
| *Trifolium pratense* (L.) (Red clover) | 2 | 1,456 ± 489 |
| *Vigna radiata* (L.) (Mung bean) | 2 | 1,237 ± 673 |
| *Fagopyrum sagittatum* Gilib. (Buckwheat) | <1 | 961 ± 213 |
| *Triticum aestivum* (L.) (Wheat) | 2 | 863 ± 1,949 |

EXAMPLE 7

*B. juncea* seedlings (cv. 426308) were prepared by placing 250 g (dry weight) of pre-soaked (one hour in room temperature tap water) seeds on a 20-inch×24-inch'2-inch ISS Growing Tray (International Specialty Supply, Cookesville, Tenn.). The seeds were irrigated three times daily by misting with 300 ml of water per tray at each irrigation. Excess water was allowed to drain from the tray. On the fifth day of growth, seedling exposure to selenium was initiated, using 250 ml of a 20 nM $NaSeO_4$ solution applied to each tray using a hand-operated spray bottle. The application was repeated three times with three hours between each application. Irrigation as described previously continued until the plants were harvested. The plants were harvested two days after the Se application, dried at room temperature, and analyzed for Se content. The experiment was repeated two additional times. Three replicates were analyzed from each experiment.

The selenium-treated seedlings grown in the commercially available sprouting trays (ISS growing trays) accumulated Se to uniform concentrations. The seedlings exhibited an average Se concentration of 2,120, 2,190, and 2,172 mg/kg in each of the three experiments, with standard deviations of 170, 101, and 280, respectively. The results show that a repeatable, and predictable, concentration of Se can be achieved using seedlings in methods according to the invention.

EXAMPLE 8

*B. juncea* (cv. 426308) seeds were soaked in water for one hour and placed in petri dishes (2.5 g seed/dish), covered, and allowed to germinate in the dark. The germinating seeds were irrigated with 20 ml tap water twice each day with excess water being drained from the dish after each irrigation. The seedlings were grown for five days before receiving an application of $FeSO_4$. The application consisted of applying 15 ml of a 100 mM $FeSO_4$ solution to each dish. The seedlings were harvested as whole plants one day after the $FeSO_4$ application, dried at 60° C., digested, and analyzed for metal content as described in the preceding Examples. The experiment was independently conducted three times.

In each one of the three experiments, the seedlings accumulated Fe to concentrations greater than 27,000 mg/kg The Fe concentrations in the seedlings were 31,120, 33,900 and 27,400 mg/kg, resulting in an average concentration of 30,806 mg/kg and a standard deviation of 3261.

While the preceding Examples illustrate certain presently preferred embodiments, the invention is clearly not limited to these particular embodiments. Thus, the invention contemplates application to higher plant forms that exhibit a seedling stage during development. The seedlings of the invention are defined as immature plants ranging from the germination stage through the two-leaf stage of development (ie., 0–10 days following seed germination under standard temperate-zone conditions of light, heat and moisture). Under standard temperate conditions of light, heat and moisture, *B. juncea* typically does not develop beyond the two-leaf seedling stage until at least ten days post-germination. Even at these early developmental stages, seedlings have been discovered to be capable of accumulating high concentrations of one or more metals of nutritional value to man or other animals without the need for metal accumulation facilitating processes such as application of electric current or use of metal chelating agents such as organic acids.

The invention contemplates that the seedlings may be etiolated, i.e., developed in the partial or complete absence of energy input in the form of light. Eliminating a light requirement during the short time required to practice the methods of the invention results in additional benefits in the form of a reduced chance of biocontamination by organisms such as bacteria or fungi and reduced need for use of antibiotics and/or antifungal agents. Thus, the methods of the invention ultimately rely on the relatively simple inputs of plant seeds (which carry their own stored energy and nutrients required for germination and initial growth) and a source of metal. In using metal sources that have a particular and constant concentration of metal, such as metal solutions prepared by those skilled in the art, the methods have been found to reproducibly generate plant seedling biomasses having a predictable concentration of a particular metal or metals in mg metal per kg of dry plant matter, without the accumulation of undesirable and potentially toxic substances. The relatively small size of the seedlings both minimizes the need for space to practice the invention while yielding a product that effectively concentrates the accumulated metal into a relatively small plant seedling biomass.

Another benefit provided by the invention is the relatively bioavailable form of metals that are contained within the seedlings produced thereby. Preliminary observations indicate that the root tissue of e.g., Brassica seedlings less than five days old does not adsorb metals to the same degree as the root tissue of older seedlings or more mature plants. These studies measured the metal extracted by washing root tissue with an aqueous solution of a chelator such as EDTA. Because metals adsorbed to root tissue are commonly inorganic forms such as simple ions, seedlings less than five days old tend to be associated with relatively little inorganic metal. Thus, metal-enriched seedlings that contain relatively little metal adsorbed to root tissue provide a nutritional supplement that advantageously contains relatively bioavailable metals. For example, plants will convert simple forms of the element selenium, such as selenite and selenate, into organic forms such as selenoamino acids (e.g., selenomethionine and selenocysteine), as disclosed in co-owned, co-pending U.S. application Ser. No. 091041,355. These organic forms of selenium are more bioavailable than the simpler elemental or simple salt forms of selenium. Consequently, more of the metal that is incubated with a plant such as a seedling is expected to be converted to a bioavailable form, thus lowering the quantity that must be accumulated to satisfy dietary requirements.

Suitable seedlings include members of the Cruciferae family, such as members of the Brassica and Raphanus genera. For example, the following species are contemplated by the invention: *Brassica juncea, Brassica nigra, Brassica campestris, Brassica carinata, Brassica napus, Brassica oleracea,* and *Raphanus sativa*. The invention is further directed to seedling biomasses that may be edible or ingestible. Ingestible or edible seedlings are seedlings that may be consumed and processed by the digestive process of an animal such as a human, thereby effecting an uptake of the metal-containing seedling material by that animal. The seedling material may be whole seedlings, a portion or portions thereof, or seedlings and/or portions processed to a ground or comminuted form.

Metals useful in practicing the invention include any of the variety of nutritionally valuable metals known in the art, regardless of form. These metals include arsenic, boron, calcium, chromium, cobalt, copper, germanium, iron, magnesium, manganese, molybdenum, nickel, potassium, selenium, silicon, vanadium, and zinc. These metals are nutrients for at least one animal, and many of the listed metals have been widely reported as general micro- or macro-nutrients. See e.g., Taiz et al., in Plant Physiology, Table 5.2, page 108 (Benjamin-Cummings Publishing Co., Inc. NY 1991). Preferred metals include chromium, iron, manganese, selenium, and zinc. Any of the aforementioned metals may be supplied to the developing seedlings in inorganic form, as ions found in simple or complex salts or in any other form known in the art. Moreover, more than one metal may be supplied to a developing seedling to provide nutritional supplements in the form of seedlings enriched with a plurality of metals to simultaneously address the nutritional requirements for more than one metal.

The period of seedling exposure to metal may be shorter than, or co-extensive with, the period of seedling growth. Preferred techniques for development and metal exposure include the use of hydroponic and aeroponic systems, which facilitate the controlled delivery of metals to developing seedlings without the risk of also exposing the seedlings to undesirable compounds such as toxins. Of course, sufficient control may be obtained using conventional agricultural practices known in the art. In addition, seedlings less than eleven days old have not been noted to require inducers (e.g., organic acids such as citric acid, or chelators such as EDTA, EGTA, or DPTA) of metal accumulation during exposure to metals, or any other time of development, in order to accumulate significant quantities of metal. In typical practice of methods of the invention following a period of metal exposure, the growth of the plant seedling biomass is interrupted. "Growth" is herein defined to mean the normal growth of the relevant seedlings. Normal growth, in turn, is understood as the conventional response of plant life to standard conditions of light, heat, moisture and fertilization designed to promote plant development, as would be understood in the art. Thus, subjecting plant seedlings to a significant change in temperature or moisture availability provides an interruption in growth. The practice of the methods of the invention involves the exposure of seedlings to metals during a developmental period that does not extend beyond ten days following germination, with exposure to metals occurring during some, or all, of that developmental period. Moreover, because plant seedlings have been observed to accumulate metal, at least predominantly by surface adsorption, when the plant tissues are no longer viable, it is within the contemplation of the invention to subject growth-interrupted seedlings to further contact with metals. As illustrative examples, growth interruption may be accomplished by simple removal of seedlings from an aqueous environment. Alternatively, growth interruption might be accomplished by thermal or chemical means without immediate removal of seedling biomass from aqueous metal solutions.

While the present invention has been described in terms of specific embodiments, it is understood that variations and modifications will occur to those skilled in the art. Accordingly, only such limitations as appear in the appended claims should be placed on the invention.

What is claimed is:

1. A plant seedling biomass suitable for use as a nutritional supplement comprising at least 100 mg boron per kg of dry plant matter, wherein growth of said plant seedling is interrupted prior to the eleventh day following germination.

2. The plant seedling biomass according to claim 1 containing from 100 to 1,000 mg boron per kg of dry plant matter.

3. A plant seedling biomass suitable for use as a nutritional supplement comprising at least 20,000 mg calcium per kg of dry plant matter, wherein growth of said plant seedling is interrupted prior to the eleventh day following germination.

4. The plant seedling biomass according to claim 3 containing from 20,000 to 70,000 mg calcium per kg of dry plant matter.

5. A plant seedling biomass suitable for use as a nutritional supplement comprising at least 2,000 mg chromium per kg of dry plant matter, wherein growth of said plant seedling is interrupted prior to the eleventh day following germination.

6. The plant seedling biomass according to claim 5 containing no more than 6,000 mg chromium per kg of dry plant matter.

7. A plant seedling biomass suitable for use as a nutritional supplement comprising at least 1,000 mg cobalt per kg of dry plant matter, wherein growth of said plant seedling is interrupted prior to the eleventh day following germination.

8. A plant seedling biomass suitable for use as a nutritional supplement comprising at least 7,000 mg copper per kg of dry plant matter, wherein growth of said plant seedling is interrupted prior to the eleventh day following germination.

9. The plant seedling biomass according to claim 8 containing no more than 30,000 mg copper per kg of dry plant matter.

10. A plant seedling biomass suitable for use as a nutritional supplement comprising at least 100 mg germanium per kg of dry plant matter, wherein growth of said plant seedling is interrupted prior to the eleventh day following germination.

11. The plant seedling biomass according to claim 10 containing from 100 to 1,000 mg germanium per kg of dry plant matter.

12. A plant seedling biomass suitable for use as a nutritional supplement comprising at least 200 mg iron per kg of dry plant matter, wherein growth of said plant seedling is interrupted prior to the eleventh day following germination.

13. The plant seedling biomass according to claim 12 containing from 200 to 60,000 mg iron per kg of dry plant matter.

14. A plant seedling biomass suitable for use as a nutritional supplement comprising at least 6,000 mg magnesium per kg of dry plant matter, wherein growth of said plant seedling is interrupted prior to the eleventh day following germination.

15. The plant seedling biomass according to claim 14 containing from 6,000 to 60,000 mg magnesium per kg of dry plant matter.

16. A plant seedling biomass suitable for use as a nutritional supplement comprising at least 8,700 mg manganese per kg of dry plant matter, wherein growth of said plant seedling is interrupted prior to the eleventh day following germination.

17. The plant seedling biomass according to claim 16 containing no more than 20,000 mg manganese per kg of dry plant matter.

18. A plant seedling biomass suitable for use as a nutritional supplement comprising at least 100 mg molybdenum per kg of dry plant matter, wherein growth of said plant seedling is interrupted prior to the eleventh day following germination.

19. The plant seedling biomass according to claim 18 containing from 100 to 1,000 mg molybdenum per kg of dry plant matter.

20. A plant seedling biomass suitable for use as a nutritional supplement comprising at least 1,000 mg nickel per kg of dry plant matter, wherein growth of said plant seedling is interrupted prior to the eleventh day following germination.

21. A plant seedling biomass suitable for use as a nutritional supplement comprising at least 100 mg selenium per kg of dry plant matter, wherein growth of said plant seedling is interrupted prior to the eleventh day following germination.

22. The plant seedling biomass according to claim 21 containing from 100 to 5,000 mg selenium per kg of dry plant matter.

23. A plant seedling biomass suitable for use as a nutritional supplement comprising at least 100 mg silicon per kg of dry plant matter, wherein growth of said plant seedling is interrupted prior to the eleventh day following germination.

24. The plant seedling biomass according to claim 23 containing from 100 to 1,000 mg silicon per kg of dry plant matter.

25. A plant seedling biomass suitable for use as a nutritional supplement comprising at least 100 mg vanadium per kg of dry plant matter, wherein growth of said plant seedling is interrupted prior to the eleventh day following germination.

26. The plant seedling biomass according to claim 25 containing from 100 to 1,000 mg vanadium per kg of dry plant matter.

27. A plant seedling biomass suitable for use as a nutritional supplement comprising at least 7,400 mg zinc per kg of dry plant matter, wherein growth of said plant seedling is interrupted prior to the eleventh day following germination.

28. The plant seedling biomass according to claim 27 containing from 7,400 to 80,000 mg zinc per kg of dry plant matter.

29. The plant seedling biomass according to any of claims 1–7, 8–20, or 21–28 wherein said plant seedling is a member of the Cruciferae.

30. The plant seedling biomass according to any of claims 1–7, 8–20, or 21–28 wherein said plant seedling biomass is selected from the group consisting of *Brassica juncea, Brassica nigra, Brassica campestris, Brassica carinata, Brassica napus*, and *Brassica oleracea.*

31. A nutritional supplement capsule, tablet, powder, gel, liquid or processed food comprising a plant seedling biomass according to any of claims 1–7, 8–20, or 21–28.

* * * * *